(12) United States Patent
Barber et al.

(10) Patent No.: US 7,649,968 B2
(45) Date of Patent: Jan. 19, 2010

(54) TIMING SYSTEM AND METHOD FOR A WIRELESS TRANSCEIVER SYSTEM

(75) Inventors: Thomas Barber, Bolton, MA (US); Aiguo Yan, North Andover, MA (US); Palle Birk, Gistrup (DK); Pier Bove, Woburn, MA (US)

(73) Assignee: Mediatek Inc., Hsin-Chu (TW)

( * ) Notice: Subject to any disclaimer, the term of this patent is extended or adjusted under 35 U.S.C. 154(b) by 596 days.

(21) Appl. No.: 11/272,253

(22) Filed: Nov. 10, 2005

(65) Prior Publication Data
US 2006/0120495 A1 Jun. 8, 2006

Related U.S. Application Data

(60) Provisional application No. 60/627,589, filed on Nov. 12, 2004.

(51) Int. Cl.
*H04L 7/00* (2006.01)
(52) U.S. Cl. .................... 375/354; 375/355; 375/356; 375/357; 375/369; 370/395.62; 370/507; 455/265; 702/89; 713/375; 713/400
(58) Field of Classification Search ................ 375/354
See application file for complete search history.

(56) References Cited

U.S. PATENT DOCUMENTS

| | | | |
|---|---|---|---|
| 4,922,517 A | 5/1990 | West, Jr. et al. | |
| 5,025,461 A * | 6/1991 | Pauer | 375/373 |
| 5,513,184 A | 4/1996 | Vannucci | |
| 5,815,819 A * | 9/1998 | Ohta et al. | 455/574 |
| 5,875,183 A | 2/1999 | Nitadori | |
| 6,040,728 A * | 3/2000 | Nelson et al. | 327/292 |
| 6,289,067 B1 | 9/2001 | Nguyen et al. | |
| 6,539,049 B1 | 3/2003 | McDonough et al. | |
| 6,564,039 B1 | 5/2003 | Meador et al. | |
| 6,829,534 B2 | 12/2004 | Fuchs et al. | |
| 6,944,475 B1 * | 9/2005 | Campbell | 455/553.1 |
| 2004/0228395 A1 * | 11/2004 | Gunzelmann et al. | 375/219 |

FOREIGN PATENT DOCUMENTS

| | | | |
|---|---|---|---|
| DE | 10311701 | * | 10/2004 |
| EP | 1187353 | | 3/2003 |
| WO | WO 00/55981 | | 9/2000 |

* cited by examiner

*Primary Examiner*—Sung Ahn
(74) *Attorney, Agent, or Firm*—Winston Hsu

(57) ABSTRACT

A timing system is disclosed for use in a wireless communication system that includes wireless transceiver and a digital baseband processing system. The timing system includes a primary clock generation system that provides a low frequency clock that is used as the reference clock for a digital signal processing system, which generates low frequency timing signals, and a secondary clock generation system that provides a high frequency clock that is used by the wireless transceiver to produce high resolution timing signals to control the timing of the wireless transceiver. The high resolution timing signals are commenced responsive to a low resolution timing signal.

10 Claims, 2 Drawing Sheets

TIMING SYSTEM AND METHOD FOR A WIRELESS TRANSCEIVER SYSTEM

PRIORITY

This application claims priority to U.S. Provisional Patent Application Ser. No. 60/627,589 filed Nov. 12, 2004.

BACKGROUND

The invention generally relates to wireless communication systems, and relates in particular to wireless transceiver systems for use in telecommunications.

Conventional wireless communications systems include one or more wireless transceivers, each wireless transceiver supporting a particular communications standard (or air interface). Each wireless transceiver typically includes a radio frequency circuit that converts baseband analog signals to radio frequency signals and communicates with a cellular network via an antenna. Each wireless transceiver also typically includes an analog baseband unit that converts the baseband analog signals to baseband digital signals. The wireless transceiver must communicate with a digital baseband processing system that includes one or more processors, either digital signal processors (DSPs) or micro-controller units (MCUs), for encoding/decoding the baseband digital data and controlling the timing of the wireless transceiver(s).

Wireless communications systems that support more than one mode (or standard) of operation typically include a plurality of wireless transceivers, each of which may need to be operated at a different clock frequency. While some systems may employ a plurality of separate clocks (e.g., crystals), such a solution may be too expensive with regard to manufacturing cost and circuit board real estate, so it is desirable to have the wireless communication system operate from a single clock source. For a wireless communications system that supports more than a single communications standard, a multi-mode wireless communications system, the system clock must be able to support the timing requirements of all of the multiple wireless interfaces in parallel as well as provide a reference clock for the digital baseband processing system. To support multiple communications standards, typically, the system clock must be run at the least common multiple of the reference clocks for all of the individual wireless interfaces. For example, a multi-mode wireless communication system supporting the 3GPP GSM and WCDMA (FDD) standards would require a 1.248 Ghz clock to support both the GSM reference clock (13 Mhz) and the WCDMA reference clock (3.84 Mhz), using a single system clock. In most cases, the frequency of the single system clock is too high for use as the reference clock for the digital baseband processing system.

There is a need, therefore, for an efficient and economical timing system for use in a wireless communications system.

SUMMARY

The invention provides a timing system for use in a wireless communication system that includes one or more wireless transceivers and a digital baseband processing system. The timing system includes a primary clock generation system that provides low frequency clock that is used as the reference clock for the digital baseband processing system. The digital baseband processing system uses the low frequency clock to produce a low resolution timing signal. The timing system also includes an additional clock generation system for each wireless transceiver that provides a higher frequency clock that is synchronous with the air interface for that transceiver. The wireless transceiver uses the higher frequency clock to produce to produce a high precision timing signal that is synchronous with the air interface.

In accordance with another embodiment, the invention provides a timing system that includes a primary clock generation system including a crystal that is used as the reference clock for the by the digital baseband processing system. The digital baseband processing system uses the low frequency clock to produce a low resolution timing signal. The timing system also includes an additional clock generation system for each wireless transceiver that provides a higher frequency clock that is synchronous with the air interface for that transceiver. The wireless transceiver uses the higher frequency clock to produce a high resolution timing signal that is synchronous with the air interface using a counter.

In accordance with another embodiment, the invention provides a method of operating a timing system for use in wireless communication systems that includes wireless transceiver and a digital baseband processing system. The method includes the steps of providing a reference clock for the digital baseband processing system, a low resolution timing signal that is produced by the digital baseband processing system, and providing high resolution timing signal(s) that are synchronous with the air interface(s) and is used to control the wireless transceiver(s).

BRIEF DESCRIPTION OF THE DRAWINGS

The following description may be further understood with reference to the accompanying drawings in which.

The drawings are shown for illustrative purposes only.

DETAILED DESCRIPTION OF THE ILLUSTRATED EMBODIMENTS

In accordance with an embodiment, the invention provides a timing system for a wireless communications system that employs a primary clock system for providing a primary clock signal that may be employed as the reference clock for a digital baseband processing system which generates low resolution timing signals and secondary clock systems that provide secondary clock signals that may be employed to generate high resolution timing signals synchronous to the air interface. The secondary clock systems are initialized by a low resolution timing signal but run at a higher frequency than the primary clock signal. The secondary clock signals may be asynchronous to the primary clock signal.

Figure 1:
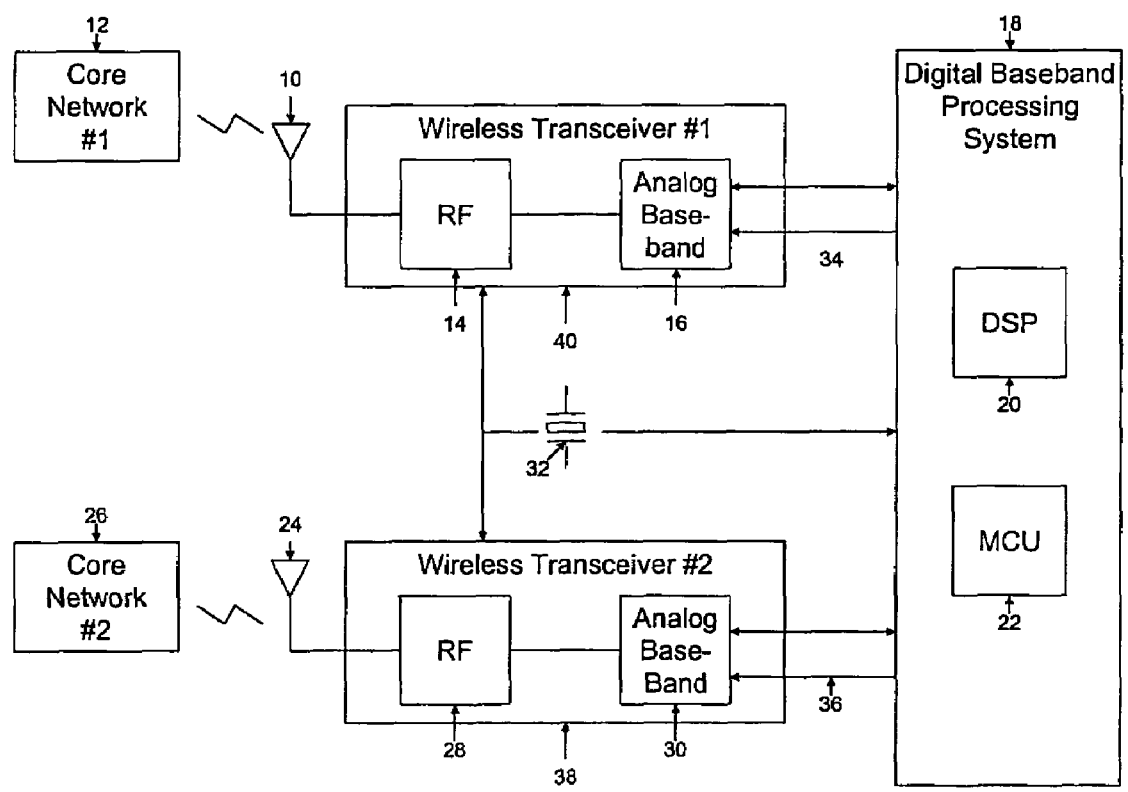
FIG. 1 shows an illustrative diagrammatic view of a wireless communications system in accordance with an embodiment of the invention.

As shown in FIG. 1, a wireless communications system in accordance with an embodiment of the invention includes one or more wireless transceivers 38, 40, each wireless transceiver supporting a particular communications standard (or air interface). Each wireless transceiver typically includes a radio frequency circuit 14, 28 that converts baseband analog signals to radio frequency signals and communicates with a cellular network 12, 26 via an antenna 10, 24. Each wireless transceiver 38, 40 also typically includes an analog baseband unit 16, 30 that converts the baseband analog signals to baseband digital signals. The wireless transceivers must communicate with a digital baseband processing system 18 that includes one or more processors, either digital signal processors 20 or micro-controller units 22, for encoding/decoding the baseband digital data and controlling the timing of the wireless transceiver(s).

A single crystal 32 provides a primary clock signal that is used as the reference clock for the digital baseband processing unit 18 at a frequency of, for example about 26 MHz. The digital baseband processing unit 18 generates low resolution timing signals 34, 36 for each of the wireless transceivers 38, 40. In response to these low resolution timing signals, higher resolution timing signals are generated which are used to control the timing of the wireless transceiver.

In particular, the digital baseband processing system 18 will place low resolution timing signal 50 within a known timing window 52 of a counter 54 within one of the wireless transceivers 38, 40. The wireless transceiver (38 or 40) will place a high resolution timing signal 56 that is synchronous with the high frequency clock 58 within the next timing window based on the counter 54 as shown in FIG. 2.

The counter for the high resolution timing signals 64 is initialized by a low resolution timing signal 60. The low resolution timing signal is assumed to fall in the middle of a known timing window 62. The counter 64 begins as soon as the first low resolution timing signal is detected, in this case by a positive edge of the high frequency clock 68.

Figure 2:
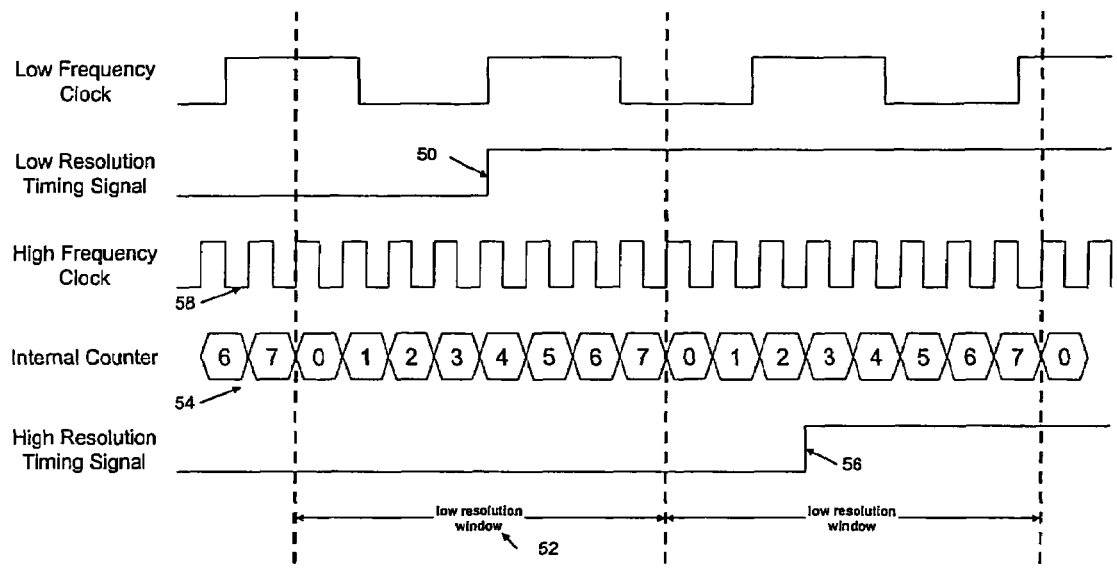
FIG. 2 shows an illustrative diagrammatic view of a timing diagram of the operation of a system as shown in FIG. 1.
Figure 3:
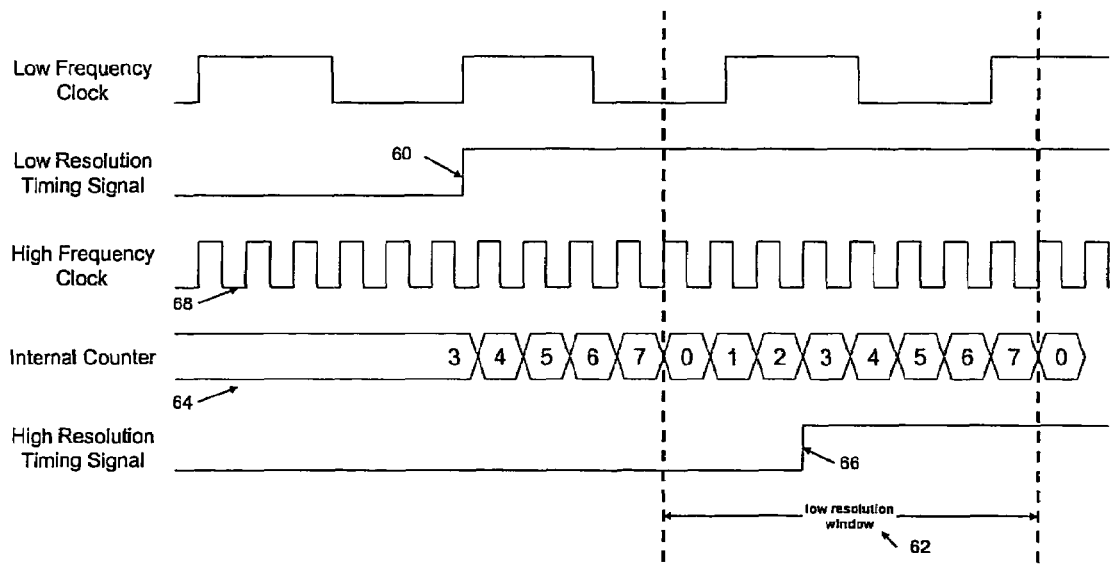
FIG. 3 shows an illustrative diagrammatic view of a timing diagram of the initialization of a system as shown in FIG. 1.

As shown in FIG. 2, the timing system in the wireless transceiver is essentially a counter where maximum value of the counter is equal to the ratio between the low resolution timing signal and the high resolution timing signal in accordance with an embodiment. For example, in a multi-mode GSM/WCDMA system the timing requirement is $\frac{1}{8}^{th}$ of a chip period or about 32.5 ns. The low resolution timing signal can provide a resolution of a chip period, about 260 ns, by using the GSM system clock (clock period ~77 ns) while the wireless transceiver produces a high frequency (30.72 Mhz) clock synchronous to the WCDMA air interface which is used by the counter to produce the high frequency timing signal that is synchronous with the air interface. Under these conditions the counter will count between 0 and 7 so, eight times the resolution is provided.

Those skilled in the art will appreciate that numerous modifications and variations may be made to the above disclosed embodiments without departing from the spirit and scope of the invention.

What is claimed is:

1. A timing system for use in a wireless communication system, said timing system comprising:
    a digital baseband processing unit that generates low resolution timing signals;
    a primary clock generation system that provides a low frequency clock signal that is used as a reference clock signal for the digital baseband processing unit; and
    a wireless transceiver that provides a high frequency clock signal that is synchronous to the air interface and that is used by the wireless transceiver to produce a high resolution timing signals to control the timing of the wireless transceiver;
    wherein said digital baseband processing unit places one of said low resolution timing signals within a known first timing window of a first counter within said wireless transceiver,
    wherein said wireless transceiver places said high resolution timing signal that is synchronous with the wireless transceiver within a second timing window based on the first counter,
    a second counter for the high resolution timing signal is initialized by said one of said low resolution timing signals,
    said one of said low resolution timing signals falling in the middle of a known third timing window,
    said second counter begins as soon as said one of said low resolution timing signals is detected by a positive edge of the high frequency clock signal of the wireless transceiver.

2. The timing system as claimed in claim 1, wherein said wireless communication system includes a plurality of wireless transceivers, and each wireless transceiver produces a secondary clock signal that is synchronous to its air interface and used to produce high resolution timing signals to control its timing.

3. The timing system as claimed in claim 1, wherein said wireless transceiver consists of a separate radio frequency circuit and a separate analog baseband unit.

4. The timing system as claimed in claim 1, wherein said high frequency clock signal has a resolution of about $\frac{1}{10}^{th}$ of the resolution of said low frequency clock signal.

5. A timing system for use in a wireless communication system, said timing system comprising:
    a digital baseband processing unit that generates low resolution timing signals;
    a primary clock generation system including a crystal that provides a low frequency clock signal that is used as a reference clock signal for the digital baseband processing unit; and
    a plurality of wireless transceivers including counters that provide secondary high frequency clock signals used by the plurality of wireless transceivers in the wireless communication system, said secondary high frequency clock signals being synchronous to their respective air interfaces;
    wherein said digital baseband processing unit places one of said low resolution timing signals within a known first timing window of a first counter within said wireless transceiver,
    wherein said wireless transceiver places one of said secondary high frequency clock signals that is synchronous with said plurality of wireless transceivers within a second timing window based on the first counter,
    a second counter for the secondary high frequency clock signals is initialized by said one of said low resolution timing signals,
    said one of said low resolution timing signals falling in the middle of a known third timing window,
    said second counter begins as soon as said one of said low resolution timing signals is detected by a positive edge of the high frequency clock signals of plurality of wireless transceivers.

6. The timing system as claimed in claim 5, wherein each wireless transceiver includes a separate radio frequency circuit and a separate analog baseband unit.

7. The timing system as claimed in claim 5, wherein said secondary high frequency clock signals has a resolution of about $\frac{1}{10}^{th}$ of the resolution of one of said low frequency clock signals.

8. A method of operating a timing system for use in a wireless communication system that includes a wireless transceiver, said method comprising steps of:
    providing a digital baseband processing unit which generates low resolution timing signals;
    providing a primary low frequency clock signal that is used as a reference clock signal for the digital baseband processing unit;
    providing a secondary high frequency clock that is used by the wireless transceiver to produce a high resolution timing signal, said secondary high frequency clock signal being commenced responsive to a low frequency timing signal generated by the digital baseband processing unit;

placing said low resolution timing signals within a known first timing window of a first counter within said wireless transceiver;

placing said high resolution timing signal that is synchronous with the secondary high frequency clock within a second timing window based on the first counter; and placing a second counter for the high resolution timing signal being initialized by said one of said low resolution timing signals, said one of said low resolution timing signals falling in the middle of a known third timing window, said second counter begins as soon as one of said low resolution timing signals is detected by a positive edge of the secondary high frequency clock.

9. The method as claimed in claim 8, wherein said wireless communication system includes a plurality of wireless transceivers, and high resolution timing signals are produced by each of said plurality of said wireless transceivers.

10. The method as claimed in claim 8, wherein said high frequency clock has a resolution of about $1/10^{th}$ of the resolution of one of said low resolution timing signals.

* * * * *

UNITED STATES PATENT AND TRADEMARK OFFICE
CERTIFICATE OF CORRECTION

PATENT NO. : 7,649,968 B2  Page 1 of 1
APPLICATION NO. : 11/272253
DATED : January 19, 2010
INVENTOR(S) : Barber et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1031 days.

Signed and Sealed this

Twenty-eighth Day of December, 2010

David J. Kappos
*Director of the United States Patent and Trademark Office*